United States Patent
Kramer et al.

(10) Patent No.: US 6,806,302 B2
(45) Date of Patent: Oct. 19, 2004

(54) PROCESS FOR THE CONTINUOUS PRODUCTION OF LIQUID, PIGMENTED COATING COMPOSITIONS

(75) Inventors: Evert Kramer, Melick (NL); Friedrich Domke, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 513 days.

(21) Appl. No.: 09/880,263

(22) Filed: Jun. 13, 2001

(65) Prior Publication Data

US 2002/0193466 A1 Dec. 19, 2002

(51) Int. Cl.⁷ .................................................. C08J 3/20
(52) U.S. Cl. ........................................................ 523/351
(58) Field of Search .................... 523/351; 524/556, 524/563, 590, 601, 612

(56) References Cited

U.S. PATENT DOCUMENTS

| | | | |
|---|---|---|---|
| 4,160,752 A | * 7/1979 | Akiyama et al. | ............ 524/274 |
| 4,851,460 A | 7/1989 | Stranghoner et al. | |
| 5,015,688 A | 5/1991 | Bederke et al. | |
| 5,017,451 A | * 5/1991 | Larson et al. | .......... 430/137.19 |
| 6,159,556 A | 12/2000 | Moller et al. | |
| 6,521,679 B1 | * 2/2003 | Okada et al. | ................ 523/336 |
| 2002/0074681 A1 | * 6/2002 | Lundgard et al. | .............. 264/78 |
| 2003/0092799 A1 | * 5/2003 | Koenraadt et al. | .......... 523/336 |
| 2003/0176564 A1 | * 9/2003 | Choudhery et al. | ......... 524/503 |

FOREIGN PATENT DOCUMENTS

| | | |
|---|---|---|
| CA | 2104846 | 3/1994 |
| CA | 2096643 | 1/2000 |
| EP | 0720990 A2 | 7/1996 |
| EP | 0887390 A1 | 12/1998 |

* cited by examiner

*Primary Examiner*—Callie Shosho
(74) *Attorney, Agent, or Firm*—Steven C. Benjamin

(57) ABSTRACT

The invention relates to a process for the continuous production of liquid coating compositions by introducing one or more low-solvent or solvent-free binders in a solid or molten state into an extruder in one stage, together with pigments and auxiliaries, wherein the components are mixed and dispersed at elevated temperature in a viscous state, then introducing proportions of binders and proportions or organic or inorganic solvents into the extruder in one or more following stages, discharging the mixture from the extruder and adding further solvents and optionally further components of the coating composition and homogenizing the process mixture in one or more rotor/stator mixers.

16 Claims, No Drawings

PROCESS FOR THE CONTINUOUS PRODUCTION OF LIQUID, PIGMENTED COATING COMPOSITIONS

FIELD OF THE INVENTION

The present invention relates to a process for the production of liquid, pigmented coating compositions containing organic solvents or water.

DESCRIPTION OF RELATED ART

Processes for the production of pigmented, liquid coatings are generally known. Such coatings consist of binders, optionally curing agents, pigments, optionally fillers and additional additives necessary in coatings, such as, dispersants, levelling agents, anticratering agents, catalysts, and aqueous or organic solvents. Such coatings are generally produced in such a manner that a pigment paste is produced from proportions of the binders, optionally from specially selected paste binders together with pigments and various additives and said paste is ground in known mills, for example, bead mills, to a suitable particle size and the pigments are wetted. Additional coating binders, additives, solvents and optionally curing agents are then added to this pigment paste and homogenized in suitable mixing units, for example, dissolvers. The process is generally a batch process. Such production processes are described, for example, in EP-A 260 447, EP-A 391 271, EP-A 586 986.

Powder coatings are produced by introducing generally solvent-free, solid binders in pellet form into an extruder together with suitable pigments, fillers, additives and this mixture is heated in the extruder such that the binders melt and the pigments are dispersed in a suitable particle size when processed by the extruder. In the case of externally cross-linking binders, curing agents and additional additives may optionally be added after dispersion. These components are homogeneously mixed and the melt is then discharged from the extruder, cooled and processed, such that relatively large pieces of powder coating are obtained. In a subsequent processing step, these pieces are then ground using suitable mills to a particle size suitable for application. Such processes are described, for example, in EP-A 0 826 018 or EP-A 0 560 792.

Processes are also known, for example, from EP-A 0 887 390 or EPA 0 720 999, for the production of powder coatings in which suitable binders are processed together with pigments and additional additives in an extruder, wherein supercritical processing media, for example, supercritical gases, such as, supercritical $CO_2$, are added to reduce viscosity in the extruder and, after discharge from the extruder, the supercritical medium is removed and a dispersed material is obtained that is converted into a powder coating in further processing steps, for example, grinding.

Disadvantages of the above-mentioned procedure for liquid coatings are that the coatings are produced in individual batches, each of which must be adjusted individually to the desired properties to allow for variations in the production process and then further processed. A batch operation also is conventional for the production of powder coatings. Elevated energy input is required in the grinding process for pigment pastes or powder coatings and the corresponding processing conditions must be precisely controlled if the binders are not to be destroyed during this process step. The grinding step is time-consuming and demanding with regard to machinery. The present invention provides a process for the production of liquid coatings, in which an elaborate precursor grinding step is avoided, and that permits continuous operation and uniform conditions during coating production.

SUMMARY OF THE INVENTION

It has surprisingly been found that a production process for the continuous production of liquid coating compositions is possible by introducing solvent-free or low-solvent solid binders into an extruder together with pigments, fillers and optionally additives, mixing and dispersing the constituents, optionally introducing and homogenizing additional binders, curing agents and additives into the process mixture, feeding organic solvents and/or water in one or more stages and reducing the viscosity and processing temperature of the process mixture, discharging the process mixture from the extruder, wherein the process mixture is homogenized by a rotor/stator mixer after addition of further organic solvents and/or water and optionally further constituents and is adjusted to the coating parameters.

DETAILED DESCRIPTION OF THE EMBODIMENTS

One embodiment of the invention contains no curing agent components in the coating composition and yields two-component coatings, in which the liquid curing agents required for cross-linking are added in a suitable quantity to the coating component only shortly before application. Another embodiment of the invention contains self cross-linking binders as the binder. Another embodiment of the invention adds suitable cross-linking agents to the coating composition in a subsequent process step in the extruder.

One embodiment of the present invention uses organic solvents for the production of the coating compositions. Another preferred embodiment uses water for producing the coating composition and additionally only small proportions of organic solvents.

Binders suitable for the process are known coating binders, wherein these binders may be self cross-linking or externally cross-linking. The binders present in the coating compositions and the optionally present cross-linking component are subject to no restriction with regard to the chemical composition thereof, provided that the binder has a suitable melting point. Film-forming binders that may be used are those film-forming resins familiar to the person skilled in the art in conventional or aqueous coating compositions, such as, epoxy resins, polyester resins, phenolic resins, (meth)acrylic copolymer resins, polyurethane resins, (meth)acrylated polyester resins and/or (meth)acrylated polyurethane resins, as well as, polyvinyl acetate-based resins. Production of the above-stated binders is known to the person skilled in the art and is disclosed, for example, in the comprehensive patent literature relating to coating binders. The binders may comprise non-functional or reactive binders, wherein the reactive binders used may comprise self cross-linking binders or reactive binders together with cross-linking agents.

The binders for the procedure according to the invention should have a low solvent content; in particular should be solvent-free. They may be in the solid state, for example, pellets, at room temperature. Such binders are known and the person skilled in the art is capable of selecting them in accordance with the type of coating composition, for example, aqueous or solvent-based, and the desired characteristics of the coating composition.

One or more binders may be selected, for example, self cross-linking binders. If externally cross-linking binders are selected, the appropriate curing agents are added to the coating composition either during the manufacturing process or directly prior to application. The curing agents usable according to the invention may, for example, be cross-linking agents or cross-linking resins based on blocked isocyanates, amine/formaldehyde condensation resins, epoxy resins and/or other binders that contain reactive groups that react with appropriate groups of the binder.

Pigments that are suitable for the procedure according to the invention are conventional inorganic or organic colored pigments, colorless or transparent pigments or fillers and extenders that are already known in top coat or special effect coatings. Examples of color-imparting pigments and fillers are titanium dioxide, micronized titanium dioxide, iron oxide pigments, silicon dioxide, barium sulphate, micronized mica, talcum, kaolin, carbon black, chalk, azo pigments, phthalocyanine pigments, perylene pigments, quinacridone pigments, pyrrolopyrrole pigments. Examples of metal effect pigments are conventional metal pigments known to the person skilled in the art, for example, made from aluminium, copper or other metals. Examples of other special effect pigments are interference pigments, such as, metal oxide-coated pigments, for example, titanium dioxide-coated aluminium, coated micas, such as, titanium dioxide-coated mica or graphite pigments.

If special effect pigments are used, for example, metal flake pigments or lamellar interference pigments, care must be taken to ensure that these pigments are added in a process step after which they are not destroyed by excessive mechanical stresses in the extruder, for example, after the viscosity of the process mixture has been reduced or before the rotor/stator mixer.

Additives which may be used in the production of the coating composition are conventional additives known in the coatings industry, such as, rheological agents, such as, highly disperse silica, phyllosilicates, cross-linked or non-cross-linked polymer microparticles, polymeric urea compounds, water-soluble cellulose ethers or synthetic polymers having ionic and/or associatively acting groups, anti-settling agents, levelling agents, light stabilizers (light protecting agents), catalysts, antifoaming agents, wetting agents, lubricants, adhesion promoters, neutralizing agents, dispersion auxiliaries, emulsifiers, waxes, catalysts, accelerators, anticratering agents, neutralizing agents, for example, for aqueous coating systems.

Suitable solvents for the corresponding coating compositions are organic solvents that contain no functional groups that are capable of reacting during production or storage with the reactive groups of the binder. Organic solvents comprise conventional coating solvents. Examples of suitable solvents are mono- or polyhydric alcohols, for example, propanol, butanol, hexanol, glycol ethers or esters, for example, diethylene glycol dialkyl ethers, dipropylene glycol dialkyl ethers, ethoxypropanol, butyl glycol; glycols, for example, ethylene glycol, propylene glycol, N-methylpyrrolidone as well as ketones, for example, methylethylketone, acetone, cyclohexanone; aromatic or aliphatic hydrocarbons, for example toluene, xylene or linear or branched aliphatic C6–C12 hydrocarbons. It is also possible in particular cases to add proportions of reactive diluents, provided that they do not react under processing conditions.

Water is used for aqueous or water-dilutable coating compositions. When water is used, it is preferred for the water-soluble or water-dispersible binder to contain hydrophilic groups and/or ionic groups to be obtained by neutralization of carboxylic or anionic groups present in the binders. Additional proportions of water-miscible solvents may also be added. The content of solvents and/or water is at least 10%, relative to the coating composition, preferably at least 15%, and is generally below 70%.

The apparatus for performing the process according to the invention is known. Extruders that may be used are, for example, conventional single or multiple screw extruders. Depending upon the type of process control, these extruders may, if required, be provided with external heating and/or external cooling. The extruders used are preferably of the type which provide further feed ports in a subsequent part of the extruder for introducing components into the process mixture. It is likewise preferred additionally to use a static mixer at the end of the extruder.

Component feed should preferably be automatic. Appropriate pumps, metering devices and automatic balances are known. Suitable pumps for conveying the viscous process mixture from the extruder are known. It is likewise convenient to provide sampling points in order to be able to test and analyse the composition and properties of the composition. Continuous measurement and process control devices may also be used.

Apparatus for homogenizing flowable process mixtures are known. These comprise for example high shear dissolvers, in particular in-line dissolvers, such as, rotor/stator mixers. These disperse and homogenize the mixture, so giving rise to a uniformly dissolved or dispersed coating composition.

The process according to the invention uses low solvent, in particular also solvent-free, binders. Mixtures of various binders may also be used. These may be present as a solid, for example, as pellets or powder, or they are fed to the extruder as a melt directly after production of the binder. At this point in time, the selected pigments and extenders may be added, as optionally may additives, for example, those for reducing viscosity or for improving dispersion and wetting of the pigments in the binder. It is, however, also possible to add these components only once the binders are in a viscous, flowable state.

The process mixture is heated as it is conveyed through the extruder in such a manner that a binder melt containing pigment is obtained, which melt contains the appropriate additives and pigments in homogeneous form. The temperature should here be below 200° C., in particular below 150° C. Extrusion according to the invention disperses the pigments in the binder until they exhibit a particle size suitable for subsequent use as a coating composition. The temperature in the extruder is dependent upon the melting point and glass transition temperature of the binder and upon the pigment/binder mixture ratio. The temperature may optionally be established by the rotational speed or shear clearance of the extruder screws or by external temperature control of the extruder. The parameters for dispersing the pigments and conveying the melt may be established by the person skilled in the art on the basis of the experience and by some experimentation. This is dependent upon the type of extruder used. The pigments should be dispersed to such an extent that an adequate chroma and hue of the coating composition are achieved, and a pigment particle size is reached suitable for the intended use, for example, smaller than 50 μm for architectural paints or smaller than 10 μm for automotive coatings.

Once the pigments have been sufficiently dispersed in the binder, additional identical or different binders and optional additives are added to the process mixture in the extruder as a further process stage. These are homogeneously incorporated as processing continues. In another subsequent process stage, proportions of the solvent, either organic solvents and/or in particular water, are added. This may in particular proceed in two or more steps in order to facilitate mixing. If water is selected as the solvent, it is convenient simultaneously or previously to add neutralizing agents or emulsifiers to the process mixture. The quantity of solvent or water is selected such that a suitable viscosity of the process mixture is achieved, i.e., the process mixture should be viscous at this point and still be conveyable with the extruder screw. Addition of the solvent reduces the viscosity of the process mixture and it is preferred that the temperature of the process mixture is reduced at the same time. The temperature must be selected such that the solvent does not boil under processing conditions.

One or more additional curing agents may optionally be added to the process mixture in a further process step. This may proceed before, during or after addition of the solvents. The temperature during this process step should be such that no reaction occurs between the curing agent and the binder. After homogenization, the process mixture is discharged from the extruder, preferably via a static mixer.

At this point in time, the process mixture has a viscosity such that it is pumpable at the prevailing process temperature. This temperature is generally below 70° C., preferably below 50° C. If required, the temperature of the process mixture may be established by means of external cooling means.

After discharge from the extruder, further proportions of organic solvents or water are added to the process mixture. The quantity is selected to obtain the composition and parameters, for example, solids content, and viscosity, of the final product. It is moreover optionally possible to add further components of the coating composition. It is, for example, possible to add at this point in particular liquid additives, such as, catalysts, thermally non-stable cross-linking agents, levelling agents, degassing agents or rheological auxiliaries. In particular, it is, however, also possible to add at this point special effect pigments that only require homogenization and dispersion in the coating composition, but do not require any grinding as is necessary for dispersing conventional coloring pigments.

The process mixture is thereafter homogenized by one or more high-shear mixers, for example a rotor/stator mixer. The vigorous mixing gives rise to a homogeneous, liquid coating composition. After homogenization, it is convenient to filter the coating composition, in order to remove contaminants or excessively coarse constituents.

The process according to the invention for the production of coating composition is performed continuously. The binders are fed, in solid or molten form, from a reservoir into the extruder, the remaining components of the coating composition are added in the process steps and, at the end of the process steps according to the process, the coating composition is transferred into a storage tank or optionally directly packaged. A suitable storage tank has the stirring elements conventional in the coatings industry for mixing the coating composition. Samples of the coating composition may be taken from this storage tank for quality control purposes or the coating composition is transferred from this storage tank into the intended package.

A preferred embodiment of the process according to the invention is the use of water as solvent. In this case, it is convenient to use either binders that are readily dispersible in water, for example, those containing hydrophilic groups, such as, OH groups, polyether groups or neutralizable groups, such as carboxyl groups or amino groups. In the latter case, the appropriate neutralizing agents must be added to the process mixture.

Using the procedure according to the invention, it is possible to produce transparent or clear coatings, but in particular single-tone coatings or special effect coatings. If special effect pigments are used in the coating composition, it is convenient not to add them at the beginning of the process in the extruder in order to avoid destroying them during extruder processing. It is convenient to add these pigments once the viscosity and temperature of the mixture have been reduced, such that the special effect pigments are exposed to only slight shear.

If self cross-linking binders are used in the process according to the invention, care should be taken to ensure that the temperature for melting the binders and during pigment dispersion are kept sufficiently low, optionally by cooling the extruder, that no reaction of the cross-linkable groups occurs. If externally cross-linking binders are used, the binders should contain only those functional groups that cannot react together, even at elevated temperature. The cross-linking agent is only added at a subsequent point in time, once the temperature of the process mixture has fallen to below any reaction temperature. This may, for example, proceed after proportions of the solvent have been added or addition may be made directly into the pumpable process mixture before the rotor/stator mixer. In this manner, it is possible to ensure that no cross-linking reactions occur that lead to contamination of the coating composition.

The process according to the invention describes a continuous production process that starts from viscous or meltable binders, into which the remaining constituents of the coating composition are apportioned, which process permits continuous dispersion of the pigments and homogenization of the coating composition. In this manner, it is ensured that, once a stable process state has been established, a uniform color shade/coating composition is always obtained. The process according to the invention is in particular suitable for the production of relatively large quantities of a coating composition. The coating compositions may be used in the automotive industry, for general industrial uses or for architectural protection.

The method according to the invention avoids additional elaborate grinding and classifying steps, as are required for producing powder coatings. Elaborate batch production of pigment pastes, as is conventional when producing liquid coating compositions, is likewise unnecessary. The procedure according to the invention also permits environmentally friendly production of liquid coating compositions in closed systems. The process according to the invention enables a low cost and simple process for the production of liquid pigmented coating compositions, such as, fillers, base coats or top coats.

What is claimed is:
1. Process for the continuous production of liquid coating compositions comprising
   a. introducing in a first stage one or more low-solvent or solvent-free binders into an extruder together with pigments and additives, and subsequently mixing and dispersing the components in a viscous state at an elevated temperature below 200° C.,
   b. introducing proportions of organic solvents and/or water and additional constituents of the coating composition in one or more following stages into the extruder, wherein the viscosity of the process mixture is reduced and the temperature of the process mixture is lowered below 70° C., c. discharging the process mixture from the extruder and adding further organic or inorganic solvents and optionally adding additional components of the coating composition and d. homogenizing the process mixture in one or more high shear mixers to form the liquid coating composition.

2. Process according to claim 1 wherein the binders are fed into the extruder in a molten state.

3. Process according to claim 1 wherein organic solvents are added to the process mixture.

4. Process according to claim 3 wherein on discharge from the extruder, the process mixture is in a flowable state.

5. Process according to claim 4 wherein additional solvents are added to the process mixture before it passes through the high shear mixer.

6. Process according to claim 1 wherein water is added to the process mixture.

7. Process according to claim 6 wherein emulsifiers and/or neutralizing agents are added to the process mixture in a process stage prior to or together with the water.

8. Process according to claim 6 wherein on discharge from the extruder, the process mixture is in a flowable state.

9. Process according to claim 1 wherein cross-linking binders are fed into the extruder.

10. Process according to claim 1 wherein cross-linking binders are fed into the process mixture in a subsequent process stage.

11. Process according to claim 1 wherein one or more organic and/or inorganic pigments and extenders are fed into the extruder together with the binders.

12. Process according to claim 11 wherein effect pigments are added to the process mixture in a subsequent process stage.

13. Process according to claim 1 wherein one or more organic and/or inorganic pigments and extenders are fed into the binders in the extruder.

14. Process according to claim 13 wherein effect pigments are added to the process mixture in a subsequent process stage.

15. Process according to claim 1 wherein the extruder comprises devices for cooling or heating the process mixture.

16. Process according to claim 15 wherein a cooling device is present between the extruder and high shear mixer.

* * * * *